(12) United States Patent
Miyazaki

(10) Patent No.: US 7,034,671 B2
(45) Date of Patent: Apr. 25, 2006

(54) ALARM DEVICE FOR INTERNAL PRESSURE OF TIRE

(75) Inventor: Toshihiro Miyazaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 229 days.

(21) Appl. No.: 10/777,057

(22) Filed: Feb. 13, 2004

(65) Prior Publication Data

US 2004/0222882 A1    Nov. 11, 2004

(30) Foreign Application Priority Data

Feb. 13, 2003    (JP)    ............................. 2003-035424

(51) Int. Cl.
*B60C 23/00*    (2006.01)
(52) U.S. Cl. ................... 340/445; 340/442; 340/447; 340/441; 73/146.5
(58) Field of Classification Search ........ 340/442–448; 73/146.2–146.5
See application file for complete search history.

(56) References Cited

U.S. PATENT DOCUMENTS

| | | | | |
|---|---|---|---|---|
| 6,271,748 B1* | 8/2001 | Derbyshire et al. | .......... | 340/442 |
| 6,292,096 B1* | 9/2001 | Munch et al. | .............. | 340/445 |
| 6,518,875 B1* | 2/2003 | DeZorzi | ..................... | 340/442 |
| 6,828,905 B1* | 12/2004 | Normann et al. | ........... | 340/447 |
| 6,829,926 B1* | 12/2004 | Cantu et al. | ............... | 73/146.4 |
| 6,945,103 B1* | 9/2005 | Lee et al. | .................. | 73/146.5 |

* cited by examiner

*Primary Examiner*—Jeffery Hofsass
*Assistant Examiner*—Anne V. Lai
(74) *Attorney, Agent, or Firm*—Oliff & Berridge, PLC

(57) ABSTRACT

The sensor unit is operated based on a first timing signal with a first interval. If there is no second timing signal with a second interval longer than the first interval, a tire internal-pressure information signal is transmitted when the alarm device judges a moving of a vehicle based on a signal from the tire rotational-movement detecting means, the signal having the tire internal-pressure data with a start bit, and the transmission of the tire internal-pressure information signal is stopped when the device judges a non-moving of said vehicle. If there is the second timing signal, the tire internal-pressure information signal is transmitted when the device judges the moving of the vehicle and N pieces of tire internal-pressure information signals are transmitted at third intervals (N is a natural number not less than 2) when the device judges a non-moving of the vehicle, each tire internal-pressure information signal having the tire internal-pressure data with said start bit. When a main switch of the vehicle is on, the receiving-side module is always in an operating state. When the main switch is off, the receiving-side module is intermittently operated at fourth intervals, each forth interval is shorter than (N-1) times of the third interval, such that a second duration for operation of the receiving-side module is longer than the third interval.

7 Claims, 4 Drawing Sheets

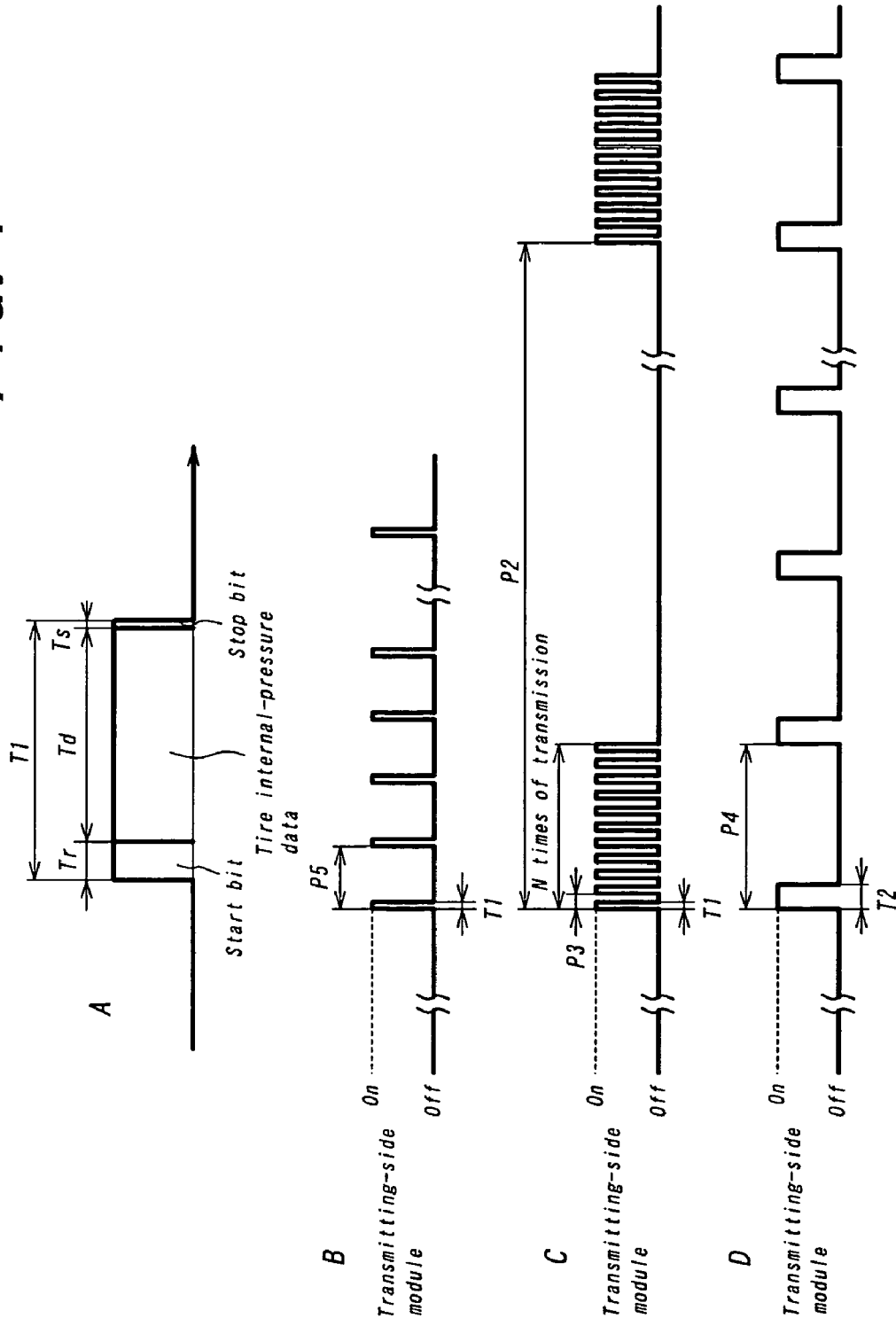

ALARM DEVICE FOR INTERNAL PRESSURE OF TIRE

BACKGROUND OF THE INVENTION

1. Field of the Invention

The present invention relates to an improvement of an alarm device for internal pressure of a tire, the alarm device monitoring a state of air pressure of each tire mounted on a body of a vehicle and notifying abnormalities of the internal pressure to a driver when the main switch of the vehicle is off or the vehicle stops.

2. Description of the Related Art

Traditionally, such an alarm device has been proposed. In the alarm device, a transmitting-side module is provided inside of the tire, the transmitting-side module comprising; a sensor unit having at least a pressure sensor for detecting the internal pressure of the tire and tire rotational-movement detecting means for detecting a rotational movement of said tire (such as a centrifugal force sensor); a signal-processing unit for processing signals detected at the pressure sensor and the tire rotational-movement detecting means; a transmitting unit for transmitting a tire internal-pressure information signal with a first duration through a transmitting antenna, the tire internal-pressure information signal having a tire internal-pressure data generated in and output from the signal-processing unit based on a detection signal from the pressure sensor; and a power supply for supplying an electric power to the sensor unit, the signal-processing unit and the transmitting unit; and a receiving-side module is provided at a vehicle side, the receiving-side module comprising; a receiving unit for receiving the tire internal-pressure information signal wireless transmitted from the transmitting antenna of the transmitting unit; and a signal-processing unit for processing tire internal-pressure data supplied from the receiving unit and outputting an alarm signal (see page 1 and FIG. 1 of JP-A-2001-80321, for example).

FIG. 1 is a diagrammatic cross-sectional view showing a state where the transmitting-side module of such an alarm device is mounted on a tire rim. This example of a transmitting-side module 1 is attached to a well section side 5 of a rim 4, integrally with a cylindrical valve device 3 for applying internal pressure to a tire 2. In this way, the transmitting-side module 1 is arranged as close as possible to an outer peripheral surface of a well section bottom 6 within the well section of the rim, so as not to interfere with the tire 2 when mounting the tire 2 onto the rim 4.

A transmitting antenna built-in the transmitting-side module 1 transmits the tire internal-pressure information signal. A receiving antenna is provided at a body side of a vehicle and receives the tire internal-pressure information signal. The tire internal-pressure information signal received by the receiving antenna is processed by the signal-processing unit. When abnormalities of the internal pressure of the tire exist, an alarm signal is generated. The abnormalities of the internal pressure of the tire are informed to the driver by the alarm signal (for example, by turning on an alarm lamp).

While the sensor unit of the transmitting-side module 1 arranged inside the rim 4 is provided with the pressure sensor and centrifugal force sensor as described above, in some cases, the sensor unit is also provided with: a temperature sensor for confirming that the operating temperatures of the above sensors are within predetermined ranges, respectively; and/or a voltage sensor for confirming that the voltage of the electric-power source is not less than a predetermined level. FIG. 1 shows a pressure sensor (the reference numeral thereof is not shown) among such sensors. These sensors typically consist of semiconductor sensors requiring electric power for operation. Further, the electric power is also consumed in the signal-processing unit and transmitting unit, for example. As a result, a large amount of electric power of the electric-power source is consumed and thus a life of the electric-power source is reduced if the electric power is always supplied to these sensor unit, signal-processing unit and transmitting unit. It is necessary to consume the electric power as small as possible because the electric-power source of the transmitting-side module 1 consists of a battery (not shown) and it is not easy to exchange the old battery with new one.

It has been proposed to drive the transmitting-side module intermittently in order to reduce the electric power consumption therein. Normally, since the change of the internal pressure of the tire does not occur rapidly, it is not necessary to transmit the tire internal-pressure information signal frequently and thus it is possible to reduce the electric power consumption by transmitting the tire internal-pressure information signal from the transmitting-side module to the receiving-side module at intervals of 60 seconds, for example.

On the other hand, the receiving-side module provided at the body side of the vehicle is powered from a battery mounted on the vehicle. Therefore, the disadvantage of the electric power consumption is not so severe as the transmitting-side module. However, there is a tendency to increase the number of electrical equipments and thus it is not preferable to keep, the receiving-side module on when the vehicle stops. As a result, it has been proposed to keep the receiving-side module off entirely when the vehicle stops. However, for example, when the tire has picked up a nail, the internal pressure reduces gradually and thus the internal pressure does not reduce to a certain value during the moving of the vehicle but reduces to a certain value at the long time stop of the vehicle.

In this case, if it is impossible to monitor the internal pressure when the receiving side module keeps off, the vehicle may restart with a low internal pressure of the tire. It is necessary to avoid the movement of the vehicle with the low internal-pressure of the tire as much as possible because the tire may be damaged frequently and considerably even if the movement of the vehicle is very short. Of course, although the operation of an apparatus for monitoring the internal pressure of the tire is started by turning on the main switch at the start of the vehicle, the vehicle may start before starting of the operation of the apparatus because the considerable reduction of the internal pressure of the tire is not represented immediately. Therefore, it is desirable to detect the internal pressure of the tire by the transmitting-side module even when the vehicle stops, transmit the information obtained from the detection of the internal pressure of the tire to the receiving-side module and to monitor the internal pressure of the tire constantly.

In this way, it is desirable to reduce the electric power consumption by driving the transmitting-side module and receiving-side module intermittently if the monitoring of the internal-pressure of the tire is performed even when the vehicle stops. However, it is impossible to synchronize the transmitting-side module and receiving-side module with each other and thus there is a disadvantage that the tire internal pressure information signal transmitted from the transmitting side module may be received by the receiving side module with a reliability. In order to improve the probability of receipt of the tire internal pressure data included in the tire internal-pressure information signal, it is conceivable to reduce the intervals of intermittent operations of the receiving side module. However, it is impossible to reduce the electric power consumption of the receiving side module effectively by the reduction of the intervals of intermittent operations of the receiving side module.

SUMMARY OF THE INVENTION

It is therefore an object of the present invention to provide an alarm device for internal pressure of a tire capable of effectively reducing an electric power consumption of a receiving side module in a manner to allow reliable receipt of tire internal pressure data by driving a transmitting-side module and the receiving-side module intermittently even when the vehicle stops, without reducing intervals of intermittent operations of the receiving side-module.

To achieve the above object, the present invention provides an alarm device for internal pressure of a tire, wherein a transmitting-side module is provided inside of the tire, the transmitting-side module comprising; a sensor unit having at least a pressure sensor for detecting the internal pressure of the tire and tire rotational-movement detecting means for detecting a rotational movement of the tire; a signal-processing unit for processing signals detected at the pressure sensor and the tire rotational-movement detecting means; a transmitting unit for transmitting a tire internal-pressure information signal with a first duration through a transmitting antenna, the tire internal-pressure information signal having a tire internal-pressure data generated in and output from the signal-processing unit based on a detection signal from the pressure sensor; and a power supply for supplying an electric power to the sensor unit, the signal-processing unit and the transmitting unit; and a receiving-side module is provided at a vehicle side, the receiving-side module comprising; a receiving unit for receiving the tire internal-pressure information signal wireless transmitted from the transmitting antenna of the transmitting unit; and a signal-processing unit for processing tire internal-pressure data supplied from the receiving unit and outputting an alarm signal;

characterized in that the sensor unit is operated based on a first timing signal with a first interval:

(a) if there is no second timing signal with a second interval longer than the first interval:

(a-1) when the device judges a moving of a vehicle based on a signal from the tire rotational-movement detecting means, a tire internal-pressure information signal is transmitted, the signal having the tire internal-pressure data with a start bit; and (a-2) when the device judges a non-moving of the vehicle, the transmission of the tire internal-pressure information signal is stopped; and (b) if there is the second timing signal:

(b-1) when the device judges the moving of the vehicle, the tire internal-pressure information signal is transmitted; and (b-2) when the device judges a non-moving of the vehicle, N pieces of tire internal-pressure information signals are transmitted at third intervals (N is a natural number not less than 2), each tire internal-pressure information signal having the tire internal-pressure data with the start bit; and wherein when a main switch of the vehicle is on, the receiving-side module is always in an operating state, and when the main switch is off, the receiving-side module is operated intermittently at fourth intervals, each forth interval is shorter than (N−1) times of the third interval, such that a second duration for operation of the receiving-side module is longer than the third interval.

According to the alarm device of the present invention, the transmitting side module detects the internal pressure of the tire based on the first timing signal, regardless of the moving or stopping of the vehicle such that the transmitting side module transmits the tire internal-pressure information signal of a normal format if there is no second timing signal and when the alarm device judges the moving of the vehicle or if there is the second timing signal and when the alarm device judges the moving of the vehicle. However, the transmitting-side module transmits N pieces of tire internal pressure information signals, each tire internal pressure information signal having the tire internal pressure data with the start bit at third intervals if there is the second timing signal and when the alarm device judges the moving of the vehicle. On the other hand, since the receiving side module is always in the operating state when the main switch of the vehicle is on, the receiving side module can receive the tire internal-pressure information signal with a reliability whenever the start bit is transmitted. Also, when the main switch of the vehicle is off, the receiving side module is operated intermittently at fourth intervals, each forth interval is shorter than (N−1) times the third interval, if there is the second timing signal and when the alarm device judges the stopping of the vehicle such that the second duration for operation of the receiving side module is longer than the third interval. Thereby, the receiving side module is an operating state at some timing in the time period for transmission of the start bit without failure, so that the start bit transmitted from the transmitting side module can be captured with a reliability. This allows the tire internal pressure data following the start bit to be received without failure. In this way, the receiving side module is driven intermittently when the main switch of the vehicle is off and thus it is possible to reduce the electric power consumption, reduce a load on an in-vehicle battery, and receive the tire internal-pressure information signal with a reliability.

Note that when the alarm device judges the non-moving of the device and an engine of the vehicle stops though the main switch is on, the receiving side module may be operated intermittently similar with the situation where the main switch is off instead of constant operation of the receiving-side module. Such a case as described above should be included within the scope of the present invention.

In the present specification, the first timing signal is a signal to determine a timing of measurement (such as pressure measurement), such that the timing during the moving of the vehicle is determined by transmitting the signal at intervals, each interval is several times (such as 6 times) of the interval of the first timing signal if there is no second timing signal. The second timing signal serves as a signal for determining the transmission timing of the tire internal pressure information signal when the vehicle stops.

In the present invention, the transmitting side module judges the moving and stopping of the vehicle based on the detection signal from the tire rotational movement detecting means. However, the term "the moving of the vehicle" means not only a situation where the vehicle is actually moving at the time of judgment, but also a situation where the vehicle moves and stops repeatedly such as in a city area. Thus, the term "the stopping of the vehicle" means not only a situation where the vehicle actually stops at the time of judgment but also a situation where the vehicle has stopped for a certain time.

Further, by determining the third interval based on the average electric field strength of the tire internal pressure information signal, it is possible to restrict the average electric field strength of the signal.

Preferably, if there is no second timing signal and when the device judges the moving of the vehicle, the transmission of the tire internal pressure information signal is performed at fifth intervals, each fifth interval is longer than the first interval and shorter than the second interval. It is preferable to take such a constitution from a standpoint for reducing the consumption of electric power of the transmitting side module.

BRIEF DESCRIPTION OF THE DRAWINGS

FIGS. 4A to 4D are signal waveform diagrams showing the operations of an alarm device for internal pressure of a tire.

DETAILED DESCRIPTION OF THE PREFERRED EMBODIMENT

There is described hereinafter an alarm device for internal pressure of a tire according to the present invention in detail, with reference to the drawings.

Figure 1:
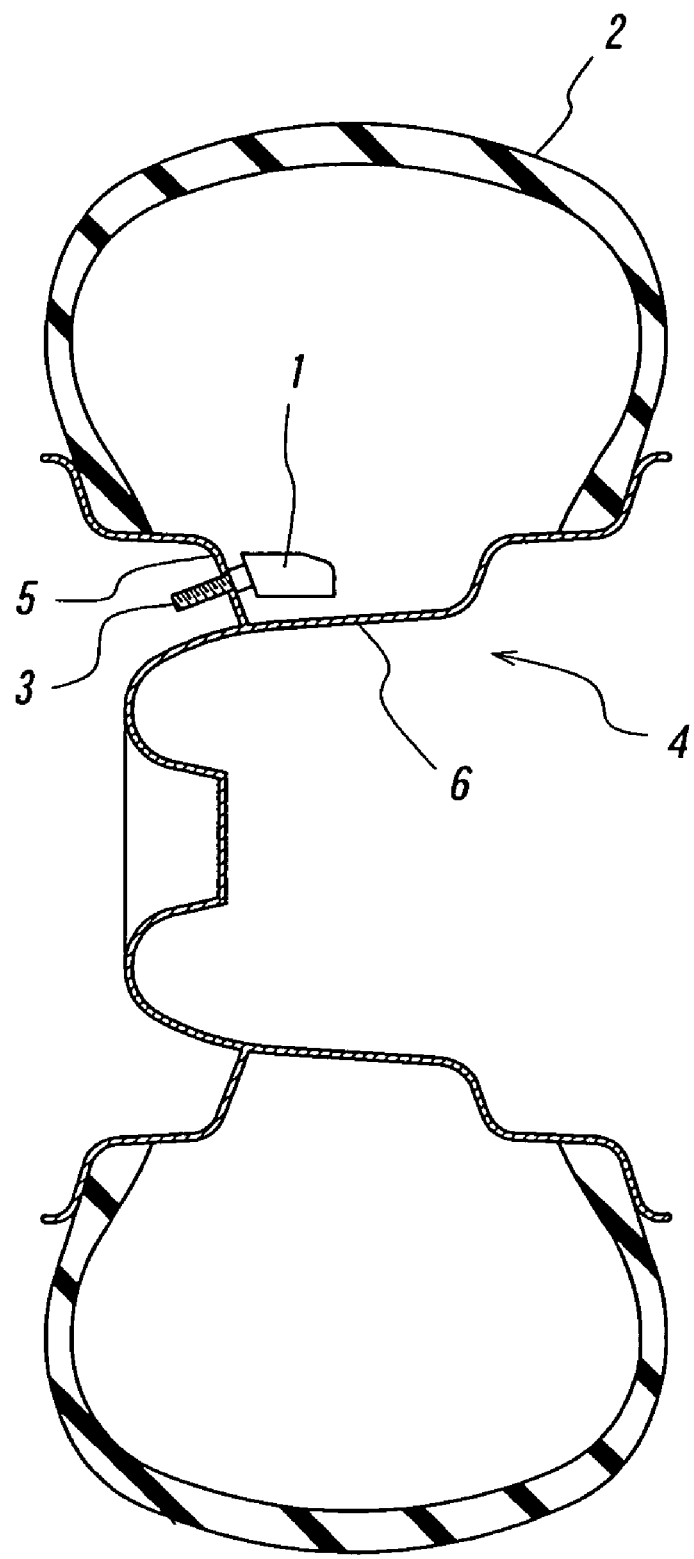
FIG. 1 is a diagrammatic cross-sectional view of a construction of a transmitting-side module of an alarm device for internal pressure of a tire, installed at a tire side.
Figure 2:
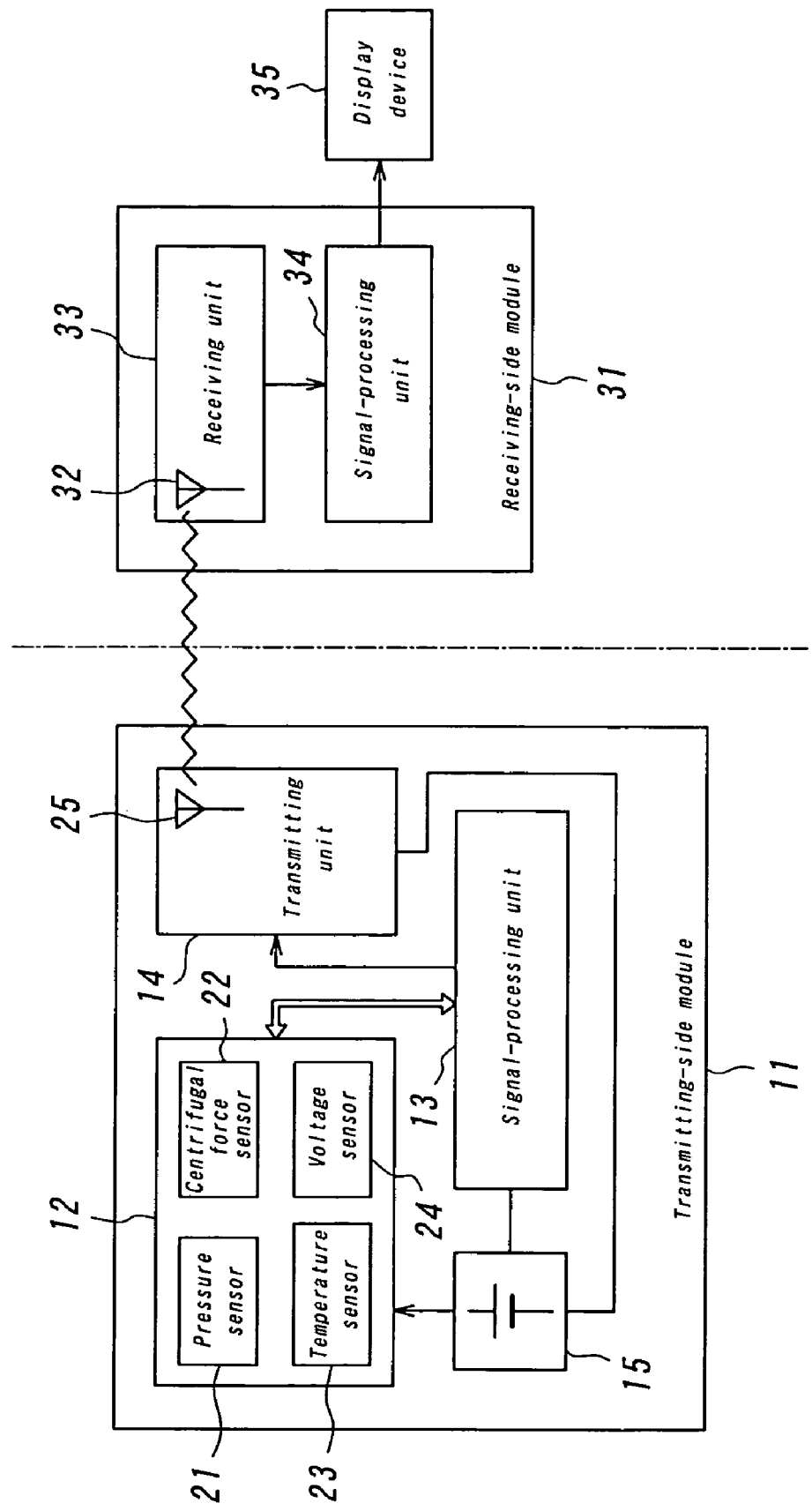
FIG. 2 is a block diagram of a construction of an alarm device for internal pressure of a tire according to a first embodiment of the present invention.

FIG. 2 is a schematic block diagram of a whole construction of the alarm device according to the present invention. The alarm device comprises a transmitting side module 11 provided at a tire side, and a receiving side module 31 provided at a vehicle side. The transmitting side module 11 has the same external appearance as the conventional module shown in FIG. 1, and consists of: a sensor unit 12; a signal processing unit 13; a transmitting unit 14; and an electric power source 15 composed of a battery for supplying electric power to these units.

In the sensor unit 12, a pressure sensor 21 for detecting internal pressure of the tire; a centrifugal force sensor 22 acting as tire rotational movement detecting means for detecting a rotational movement of the tire; a temperature sensor 23 for detecting the temperature of the sensor unit; and a voltage sensor 24 for detecting an output voltage of the electric power source 15 are provided. These sensors consist of semiconductor elements, respectively, and thus it is necessary to supply electric power to the sensors from the electric power source 15 so as to operate them.

The signal processing unit 13 has functions to: control the driven state of the sensor unit 12; process various signals supplied from the sensor unit 12 to generate a tire internal pressure data; and generate a tire internal pressure information signal in a predetermined format including the tire internal pressure data; and the details thereof are described later. The transmitting unit 14 with a built-in a transmitting antenna 25, the antenna 25 transmitting the tire internal-pressure information signal output from the signal-processing unit 13, is supplied with electric power from the electric-power source 15 similar to the sensor unit 12 and signal-processing unit 13. Although these sensor unit 12, signal-processing unit 13 and transmitting unit 14 consist of an integrally structured semiconductor chip, these units may alternatively consist of combined discrete parts.

The receiving side module 31 has: a receiving unit 33 for receiving, by a receiving antenna 32, the tire internal pressure information signal transmitted from the transmitting antenna 25 provided in the transmitting unit 14 of the transmitting side module 11, thereby processing the signal in a usual manner and outputting a receipt signal; and a signal processing unit 34 for receiving the receipt signal and for outputting a tire internal pressure abnormality signal upon sensing abnormalities in the internal pressure of the tire. The tire internal pressure abnormality signal output from the signal processing unit 34 is supplied to a display device 35 arranged at a position easily visible from a driver's seat in the vehicle, thereby displaying the state of the internal pressure of the tire. For example, it is possible to utilize a front panel for a driver's seat, as the display device 35.

The signal processing unit 13 of the transmitting side module 11 generates first timing signals at first intervals such as 10 seconds, and drives the sensor unit 12 based on the first timing signals. Thus, the pressure sensor 21, centrifugal force sensor 22, temperature sensor 23 and voltage sensor 24 provided in the sensor unit 12 detect respective physical quantities at intervals of 10 seconds, and this interval of 10 seconds corresponds to that for the first timing signal. It is possible to reduce the power consumption remarkably compared with a situation where the sensors operate constantly, though it is necessary to take a certain time period such as 30 ms by the time point of stabilization of the outputs of all of the sensors 21 to 24 upon measuring by these sensors. Further, the signal processing unit 13 also generates second timing signals at second intervals much longer than the intervals for the above-mentioned first timing signals. Such a second interval may be as long as 60 minutes, for example.

The pressure sensor 21, the centrifugal force sensor 22, the temperature sensor 23 and the voltage sensor 24 of the sensor unit 12 output a pressure signal, centrifugal force signal, temperature signal and voltage signal, respectively, which are supplied to the signal-processing unit 13, and this signal-processing unit 13 processes these detection signals in accordance with a predetermined algorithm, thereby obtaining values of the tire internal-pressure, the centrifugal force, the temperature, and the output voltage value of the electric-power source 15. Here, the values of the temperature and the voltage are obtained to confirm whether these values are within a temperature range and a voltage range for allowing suitable operation of the applicable sensors composed of semiconductor elements, respectively. Hereinafter, it is assumed that the temperature and the voltage are within predetermined ranges, respectively, for the convenience of the explanation.

In the present invention, since an operation mode of the transmitting side mode 11 when the alarm device judges the moving of the vehicle is different from that when the alarm device judges the stopping of the vehicle, the transmitting side module 11 judges the vehicle state by processing the centrifugal force value output from the centrifugal force sensor 22. Namely, although the tires rotates when the vehicle moves and thus the centrifugal force is generated, the tires do not rotate when the vehicle stops and thus the centrifugal force is not generated. Therefore, it is possible to judge the moving state of the vehicle by measuring the centrifugal force. Note that since it is advantageous to judge that the vehicle moves when the moving and the stopping of the vehicle are repeated frequently such as in a situation where the vehicle moves on the congested road, the alarm device judges that the vehicle is in a stopping state such as when the centrifugal force is not detected continuously over a considerably long period.

Figure 3:
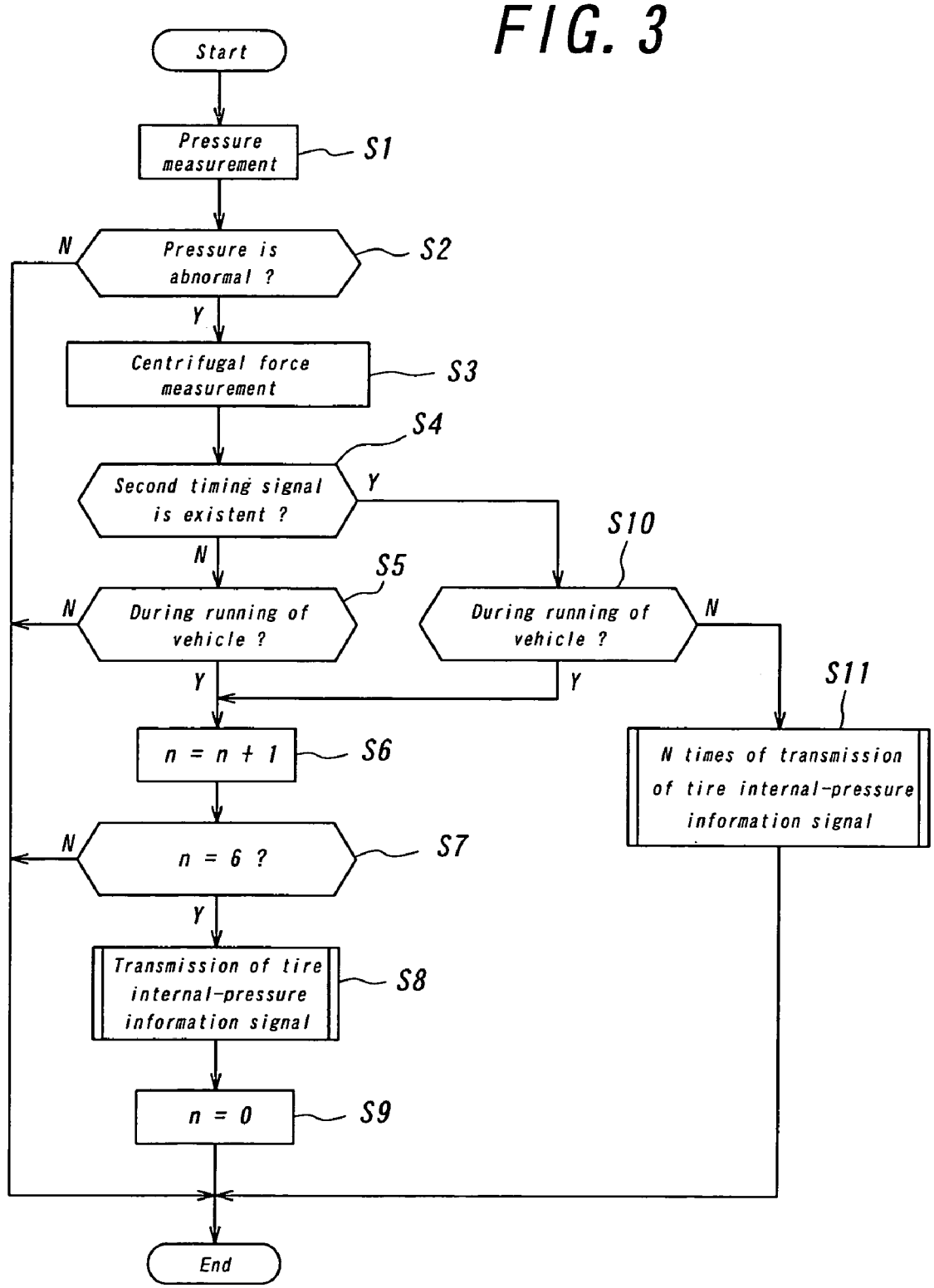
FIG. 3 is a flowchart of operations of an alarm device for internal pressure of a tire.

FIG. 3 is a flowchart of a transmitting operation depending on the vehicle state. As described above, the sensor unit 12 performs measurements based on the first timing signals at first intervals (10 seconds). Firstly, in step S1, the pressure is measured, and in step S2, the signal-processing unit 13 judges whether the measured tire internal pressure is abnormal or not. In this embodiment, the tire internal pressure data representing abnormalities in the tire internal-pressure is generated when the measured tire internal pressure is judged to be lower than a predetermined pressure. Otherwise, the tire internal pressure is not generated and transmitted. Meanwhile, the centrifugal force is measured at the next step S3 only when the measured tire internal pressure is lower than the predetermined pressure and thus the tire internal pressure data is generated. Further, in step S4, the alarm device judges whether the above-mentioned second timing signal exists or not.

Here, assuming that no second timing signal exists, in step S5, the alarm device judges whether the vehicle moves or not. If the alarm device judges that the vehicle does not move, i.e., the vehicle is in a stopping state in step S5, the tire internal pressure information signal is not transmitted.

On the other hand, when it is judged that the vehicle moves, a count value "n" of a counter (not shown) is incremented by 1 in step S6, and it is judged whether the count value "n" reaches 6 or not in step S7. When the count value "n" reaches 6, the tire internal pressure information signal is transmitted in the next step S8, and the counted value "n" is reset to zero at the next step S9 and then this routine is terminated. If the count value "n" of the counter reaches 6, this routine is terminated. That is, the tire internal pressure information signal in this embodiment is transmitted, not in a manner that the tire internal pressure information signals to be obtained at first intervals of 10 seconds are transmitted each time, but in a manner that the tire internal pressure information signals each having a tire internal pressure data with a start bit to be explained later are transmitted at intervals of 1 minute each of which is 6 times of the interval of the first timing signal. Thus, the tire internal pressure information signal is transmitted once per 6 times of the tire internal pressure collecting operations. Generally, it is enough to transmit the tire internal pressure information to the receiving side module 31 at intervals of 1 minute because the internal pressure of the tire is not so suddenly changed. However, the internal pressure of the tire is measured herein at shorter intervals of 10 seconds, and the tire internal-pressure information signal is immediately transmitted when the internal pressure of the tire is suddenly reduced, so as to cope with a situation of a sudden reduction of the internal pressure of the tire. However, this is not the essential point of the present invention, and thus the detailed explanation thereof is not provided any more.

FIG. 4A shows a format of the tire internal-pressure information signal when it is transmitted from the transmitting antenna 25 of the transmitting unit 14. In this case, the tire internal-pressure information signal consists of: a tire internal-pressure data; a start bit(s) added to the head the tire internal-pressure data; and a stop bit(s) added to the end of the tire internal-pressure data.

Since the transmitting side module 11 arranged at the tire side is not synchronized with the receiving side module 31 arranged at the vehicle side, the start bit is provided at the head of the tire internal pressure information signal such that the synchronization is established upon detecting the start bit by the receiving side module 31. Thus, upon detecting the start bit by the receiving side module 31, the tire internal pressure data following the start bit can be fetched. The stop bit represents the termination of the tire internal-pressure data. In this embodiment, the time period Tr for addition of the start bit, time period Td for duration of the tire internal pressure data, and time period Ts for addition of the stop bit are set to be 1.8 ms, 8 ms and 0.2 ms, respectively. This results in a duration T1 of 10 ms for the tire internal pressure information signal.

While the main switch of the vehicle is on, the receiving side module 31 is always in an operating state. Thus, the start bit added at the head of the tire internal pressure information signal from the transmitting side module 11 is detected and the tire internal-pressure data following it can be precisely fetched by the receiving side module 31, no matter what timing the tire internal-pressure information signal is transmitted at.

Incidentally, it is judged whether the vehicle moves or not in step S10 when the above-mentioned second timing signal exists in step S4 in FIG. 3. The flow proceeds to step S6 when it is judged that the vehicle moves.

FIG. 4B shows an operating situation of the transmitting side module 11 when no second timing signal exists and the vehicle moves. In this case, the tire internal pressure information signal of the format shown in FIG. 4A is transmitted at intervals P5 (such as 1 minute) corresponding to 6 times the interval P1 (such as 10 seconds) for the first timing signal.

FIG. 4C shows an operating situation of the transmitting side module 11 when the second timing signal exists. In this case, the tire internal pressure information signal of the format shown in FIG. 4A is transmitted at intervals P2 (such as 60 minutes). In the present invention, it is judged that the vehicle does not move, i.e., is in a stopping state in step S10, the tire internal pressure information signal of the format shown in FIG. 4A is transmitted by N pieces (N is a natural number of 2 or larger) at regular intervals P3. In this embodiment, the interval P3 is determined based on an average electric field strength of the tire internal-pressure information signal, thereby restricting the average electric field strength of the signals.

FIG. 4D shows an operating situation of the receiving side module 31 when the main switch of the vehicle is off. Note that while the main switch of the vehicle is on, the receiving side module 31 is always in an operating state. Thus, the start bit included in the tire internal pressure information signal from the transmitting side module 11 can be received so that the tire internal pressure data following it can be fetched no matter what timing the tire internal pressure information signal is transmitted at. However, if the signal of the same format as the above one is transmitted even when the main switch of the vehicle is off, the tire internal pressure following the start bit can be certainly fetched only when the start bit is fortunately being transmitted from the transmitting side module 11 during operation of the receiving side module 31, and otherwise, the start bit cannot be received and the tire internal pressure data cannot be fetched.

Thus, in the present invention, when it is judged that the second timing signal exists and the vehicle does not move, the receiving side module 31 is operated intermittently at intervals P4 each of which is shorter than the transmitting period of (N−1) pieces of tire internal-pressure information signals such that the duration T2 for operation of the receiving side module 31 is made longer than the interval P3. As a result, the receiving side module 31 is necessarily brought into an operating state at some timing in the first time period Tr for transmission of the start bit, so that the start bit transmitted from the transmitting side module 11 can be assuredly captured. This allows the tire internal pressure data following the start bit, to be assuredly fetched. In this way, the receiving side module 31 is driven intermittently while the main switch of the vehicle is off, thereby allowing a reduced electric power consumption, a reduced load on an in-vehicle battery, and reliable receipt of the tire internal-pressure data representing abnormalities of the tire internal-pressure.

That is, the duration T2, interval P3, interval P4 and the number N of times of transmission of the tire internal-pressure information signal have the following relationships among them:

$$T1 < T2 \qquad (1),$$

and $$P4 < P3 \times (N-1) \qquad (2)$$

Here, assuming that T1=10 ms, T2=110 ms, P3=100 ms, P4=990 ms, and N=11, the power consumption of the receiving-side module 31 becomes T2/P4=110/990=11.1% as compared with a situation where the receiving side module 31 is constantly kept ON during stoppage of the vehicle.

The present invention is not limited to the above embodiment, and various changes and modifications are possible. For example, although the interval of the timing signal for the transmitting side module is set at 10 seconds, this interval may be arbitrarily set. Further, although the tire internal-pressure information to be obtained on the basis of the first timing signal during running of vehicle has been transmitted at intervals of 1 minute in the above embodiment, this interval is arbitrary and the tire internal-pressure information may be transmitted at the same intervals as those for the first timing signals.

Further, as the tire rotational movement detecting means, it is possible to use another type of sensor such as a vehicular speed sensor in addition to the centrifugal force sensor, while the duration T2, interval P3, interval P4 and the number N of times of transmission of the tire internal-pressure information signal may be set at arbitrary values insofar as satisfying the conditions of the equations (1) and (2). Particularly, the intervals P3 upon transmitting the N pieces of tire internal-pressure information signals are not required to be all the same, and may be set differently from each other. In the latter case, the duration T2 is required to be longer than the longest one of the different intervals P3.

The invention claimed is:

1. An alarm device for internal pressure of a tire, wherein a transmitting-side module is provided inside of said tire, said transmitting-side module comprising; a sensor unit having at least a pressure sensor for detecting said internal pressure of said tire and tire rotational-movement detecting means for detecting a rotational movement of said tire; a signal-processing unit for processing signals detected at said pressure sensor and said tire rotational-movement detecting means; a transmitting unit for transmitting a tire internal-pressure information signal with a first duration through a transmitting antenna, said tire internal-pressure information signal having a tire internal-pressure data generated in and output from said signal-processing unit based on a detection signal from said pressure sensor; and a power supply for supplying an electric power to said sensor unit, said signal-processing unit and said transmitting unit, and a receiving-side module is provided at a vehicle side, said receiving-side module comprising; a receiving unit for receiving said tire internal-pressure information signal wireless transmitted from said transmitting antenna of said transmitting unit; and a signal-processing unit for processing tire internal-pressure data supplied from said receiving unit and outputting an alarm signal;

characterized in that said sensor unit is operated based on a first timing signal with a first interval:

(a) if there is no second timing signal with a second interval longer than said first interval:

(a-1) when said device judges a moving of a vehicle based on a signal from said tire rotational-movement detecting means, a tire internal-pressure information signal is transmitted, said signal having said tire internal-pressure data with a start bit; and (a-2) when said device judges a non-moving of said vehicle, the transmission of said tire internal-pressure information signal is stopped; and (b) if there is said second timing signal:

(b-1) when said device judges the moving of said vehicle, said tire internal-pressure information signal is transmitted; and (b-2) when said device judges a non-moving of said vehicle, N pieces of tire internal-pressure information signals are transmitted at third intervals (N is a natural number not less than 2), each tire internal-pressure information signal having the tire internal-pressure data with said start bit; and wherein when a main switch of said vehicle is on, said receiving-side module is always in an operating state, and when said main switch is off, said receiving-side module is operated intermittently at fourth intervals, each fourth interval is shorter than (N−1) times of said third interval, such that a second duration for operation of said receiving-side module is longer than said third interval.

2. The alarm device according to claim 1, wherein said third interval is determined based on an average electric field strength of said tire internal-pressure information signal.

3. The alarm device according to claim 2, wherein if there is no second timing signal and when said device judges the moving of said vehicle, the transmission of said tire internal-pressure information signal is performed at fifth intervals, each fifth interval is longer than said first interval and shorter than said second interval.

4. The alarm device according to claim 2, wherein said signal processing unit of said transmitting-side module compares said tire internal-pressure to be obtained based on a detection signal from said pressure sensor, with a certain pressure; and generates the tire internal-pressure data representing that the tire internal pressure detected by said pressure sensor is out of range of a certain level.

5. The alarm device according to claim 1, wherein if there is no second timing signal and when said device judges the moving of said vehicle, the transmission of said tire internal-pressure information signal is performed at fifth intervals, each fifth interval is longer than said first interval and shorter than said second interval.

6. The alarm device according to claim 5, wherein said signal processing unit of said transmitting-side module compares said tire internal-pressure to be obtained based on a detection signal from said pressure sensor, with a certain pressure; and generates the tire internal-pressure data representing that the tire internal pressure detected by said pressure sensor is out of range of a certain level.

7. The alarm device according to claim 1, wherein said signal processing unit of said transmitting-side module compares said tire internal-pressure to be obtained based on a detection signal from said pressure sensor, with a certain pressure; and generates the tire internal-pressure data representing that the tire internal pressure detected by said pressure sensor is out of range of a certain level.

* * * * *